US010858261B2

(12) United States Patent
Lopez Gomez et al.

(10) Patent No.: US 10,858,261 B2
(45) Date of Patent: Dec. 8, 2020

(54) METHOD FOR OBTAINING CALCIUM ALUMINATES FROM NON-SALINE ALUMINUM SLAGS

(71) Applicants: CONSEJO SUPERIOR DE INVESTIGACIONES CIENTIFICAS (CSIC), Madrid (ES); VARMOXZ, Apodaca, Nueva Leon (MX)

(72) Inventors: Felix Antonio Lopez Gomez, Madrid (ES); Francisco Jose Alguacil Priego, Madrid (ES); Jose Ramon Gonzalez Gracia, Nueva Leon (MX); Mario Sergio Ramirez Zablah, Nueva Leon (MX)

(73) Assignees: ARZYZ, S.A. DE C.V., Nuevo Leon (MX); CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 0 days.

(21) Appl. No.: 15/748,323

(22) PCT Filed: Jul. 26, 2016

(86) PCT No.: PCT/ES2016/070566
§ 371 (c)(1),
(2) Date: Jan. 29, 2018

(87) PCT Pub. No.: WO2017/017304
PCT Pub. Date: Feb. 2, 2017

(65) Prior Publication Data
US 2018/0222764 A1    Aug. 9, 2018

(30) Foreign Application Priority Data
Jul. 28, 2015    (ES) .................................. 201531116

(51) Int. Cl.
*C01F 7/16* (2006.01)
*C22B 7/04* (2006.01)
(Continued)

(52) U.S. Cl.
CPC ................ *C01F 7/164* (2013.01); *C04B 5/00* (2013.01); *C04B 7/32* (2013.01); *C04B 35/22* (2013.01);
(Continued)

(58) Field of Classification Search
CPC ....... C01F 7/164; C22B 7/04; C22B 21/0069; C22B 21/04; C04B 5/00; C04B 7/32;
(Continued)

(56) References Cited

U.S. PATENT DOCUMENTS

2011/0182803 A1* 7/2011 Ito ........................... C01F 7/164
423/600
2014/0224069 A1* 8/2014 Dube ........................ C22B 7/04
75/570

FOREIGN PATENT DOCUMENTS

CN    101492262 A    7/2009
CN    101913634 A    12/2010
(Continued)

OTHER PUBLICATIONS

O.P. Mtschedlow-Petrossian; "About the thermodynamic research of solid-body reactions in silicate systems"; Chair of Construction Material Science of the Kharkov Institute of Railway Engineers; 1958; p. 209-212; 9 No. 5.
(Continued)

*Primary Examiner* — James A Fiorito
(74) *Attorney, Agent, or Firm* — Hayes Soloway P.C.

(57) ABSTRACT

The present invention relates to a method for obtaining calcium aluminates for metallurgical use from non-saline
(Continued)

aluminum slags by means of reactive grinding and thermal treatment.

6 Claims, 16 Drawing Sheets

(51) Int. Cl.
| | |
|---|---|
| *C21C 7/076* | (2006.01) |
| *C04B 35/622* | (2006.01) |
| *C04B 35/44* | (2006.01) |
| *C04B 7/32* | (2006.01) |
| *C04B 35/626* | (2006.01) |
| *C04B 35/64* | (2006.01) |
| *C04B 5/00* | (2006.01) |
| *C04B 35/22* | (2006.01) |
| *C21C 7/064* | (2006.01) |
| *C22B 21/00* | (2006.01) |
| *C22B 21/04* | (2006.01) |

(52) U.S. Cl.
CPC ........ *C04B 35/44* (2013.01); *C04B 35/62204* (2013.01); *C04B 35/62615* (2013.01); *C04B 35/62645* (2013.01); *C04B 35/64* (2013.01); *C21C 7/0645* (2013.01); *C21C 7/076* (2013.01); *C22B 7/04* (2013.01); *C22B 21/0069* (2013.01); *C22B 21/04* (2013.01); *C01P 2002/32* (2013.01); *C01P 2004/61* (2013.01); *C04B 2235/322* (2013.01); *C04B 2235/3206* (2013.01); *C04B 2235/3208* (2013.01); *C04B 2235/3222* (2013.01); *C04B 2235/3267* (2013.01); *C04B 2235/3272* (2013.01); *C04B 2235/3279* (2013.01); *C04B 2235/3281* (2013.01); *C04B 2235/3284* (2013.01); *C04B 2235/3418* (2013.01); *C04B 2235/3445* (2013.01); *C04B 2235/3454* (2013.01); *C04B 2235/3865* (2013.01); *C04B 2235/5436* (2013.01); *C04B 2235/661* (2013.01); *C04B 2235/80* (2013.01); *Y02P 10/218* (2015.11); *Y02P 10/242* (2015.11)

(58) Field of Classification Search
CPC ... C04B 35/22; C04B 35/44; C04B 35/62204; C04B 35/62615; C04B 35/62645; C04B 35/64; C21C 7/0645; C21C 7/076
See application file for complete search history.

(56) References Cited

FOREIGN PATENT DOCUMENTS

| | | |
|---|---|---|
| CN | 104961444 A | 10/2015 |
| EP | 0733591 A1 | 3/1996 |
| JP | H05294685 A | 11/1993 |

OTHER PUBLICATIONS

Mgrinz;"Investigation on the influence of firing temperature and time on the rate of synthesis of calcium aluminates in the solid phase of the CaO-Al2O3 system"; Cement-Lime-Gypsum; p. 177-182; No. 7-8.
"The Making, Shaping and Treating of Steel"; Steelmaking and Refining Volume; 1998; p. 100-101, 150-151, 256-257, 421; 11th Edition; United States Steel Corporation; Pittsburgh, Pennsylvania.
B. Audouze; "Contribution to the study of the solid state reaction between lime and alumina"; Speech made in the International Conference of studies; 1959; 11 pages.
W.L. De Keyser;"Contribution a l'etude des reactions a l'etat solide entre OCa, O3Fe2, O3AO2"; Bull. Soc. Chim. Belg., 64, pp. 395-408, 7 fig., 1955.
R.W. Nurse et al.;"The CaO-Al2O3 System in a Moisture-free Atmosphere"; Transactions of the British Ceramic Society; Sep. 1965; p. 409-419.
J. Williamson; "Reactions in Heated Lime-Alumina Mixtures"; J. Appl. Chem.; Dec. 1962; p. 535-538.
Richarson, F.D. "Secondary steelmaking metallurgy".
Ghoroi;"Solid-Solid Reaction Kinetics: Formation of Tricalcium Aluminate"; Thermodynamics; Feb. 2007; p. 502-513; vol. 53, No. 2.

* cited by examiner

METHOD FOR OBTAINING CALCIUM ALUMINATES FROM NON-SALINE ALUMINUM SLAGS

The present invention relates to a method for obtaining calcium aluminates for metallurgical use from non-saline aluminum slags by means of reactive grinding and thermal treatment.

STATE OF THE ART

Calcium aluminates are described in the binary phase diagram $CaO$—$Al_2O_3$ [R. W. Nurse, J. H. Welch and A. J. Majumdar, The $CaO$—$Al_2O_3$ System in a Moisture-free Atmosphere, Trans. Br. Ceram. Soc., 64, 409-418 (1965)]. In this system five binary compounds generically called calcium aluminates can be distinguished: $CaAl_2O_4$ (CA), $CaAl_4O_7$ ($CA_2$), $Ca_{12}Al_{14}O_{33}$ ($C_{12}A_7$), $Ca_3AlO_6$ ($C_3A$) and $CaAl_{12}O_{19}$ ($CA_6$) where C=CaO and A=$Al_2O_3$.

The $CaO$—$Al_2O_3$ system has been studied by many researchers. One of the first papers was written by De Keyser [W. L. De Keiser, Contribution à l'étude des réactions à l'état solide entre la chaux et lálumine, Bull. Soc. Chim. Belg., 60, 516-541 (1951).] who established the principle that in the $CaO$—$SiO_2$—$Al_2O_3$ system, the direction and succession of the reactions do not depend on the concentrations of the constituents of the mixture. Macias and Welizek [J. Macias and Z. Weliszek, Cement-Wapno-Gibs, 19, 170-177 (1964)] calculated that, whatever the initial molar ratio may be in a reaction between CaO and $Al_2O_3$, the first product obtained is CA. Audouze [B. Audouze, Solid-State Reactions Between CaO and $Al_2O_3$, Silicates Industries, 26, 179-190 (1961).], Babushkin and Mchedlow-Petrosyan [V. Babushkin and O. Mchedlov-Petrosyan, Silicattenchn, 9, 109-120 (1958).] established different reaction sequences. Williamson and Glasser [J. Williamson, F. J. Glasser, Reactions in Heated Lime-Alumina Mixtures, J. Appl. Chem. 12 535-538 (1962).] studied different molar ratios of CaO:$Al_2O_3$, not finding that any preferred phase was formed as the first reaction product. These studies performed, sometimes with contradicting results, have led the following reaction sequence to be considered as the most probable:

$$A+C \rightarrow AC+C \rightarrow C_{12}A_7+C \rightarrow C_3A \quad (1)$$

$$A+C \rightarrow AC+A \rightarrow CA_2+A \rightarrow CA_6 \quad (2)$$

These reactions are produced mainly by the diffusion of the $Ca^{2+}$ inside the $Al_2O_3$, resulting, in the sintering of CaO and $Al_2O_3$ mixtures at temperatures to the order of 1300° C., in a sequence of phase contents that responds to the relationship:

$$C_3A > C_{12}A_7 > CA_6 > CA_2 \approx CA.$$

Calcium aluminates have applications as refractory cement due to the stability thereof at high temperatures, among other characteristics, and are also used in the metallurgical process for manufacturing steel, where the contribution of a synthetic calcium aluminate-based slag encourages the steel desulfurization process and obtaining steel free from inclusions, especially $Al_2O_3$. Furthermore, the presence of a molten calcium aluminate slag over the steel facilitates the work in the secondary metallurgy, due to the suitable fluidity thereof, and it protects the steel from re-oxidation processes and temperature loss. [Harold E. McGannon, The Making, Shaping and Treating of Steel (Steel Making and Refining), 11$^{th}$ Edition, American Society for Metals, United States Steel Corporation, Pittsburgh, Pa. (1998)].

The majority of the calcium aluminate consumed by the steel sector is sintered from bauxite and lime mixtures. The leveraging of slags resulting from the fusion of aluminum, and thus, with a high $Al_2O_3$ content, is shown as an alternative to the use of bauxite for producing calcium aluminates.

Industrially, obtaining calcium aluminate-based materials is carried out by means of cold sintering or by means of hot sintering. The cold sintering processes use bauxite, aluminum slags, mainly saline slags, or the products resulting from the salt recovery by means of hydrolysis and crystallization from saline slags. Normally, commercial ground CaO is used, which is mixed with the slag in variable proportions, comprised between 0.2-1.8 of CaO:$Al_2O_3$. The mixtures are ground and conventional binders are added to the ground product in order to carry out a pelletizing process (pellets with a diameter comprised between 1 and 50 mm) or briquettes (with sizes comprised between 4 and 100 mm). The pellets or briquettes are sifted, dried and packaged.

In the hot sintering processes, the pellets or briquettes are sintered in rotary furnaces, reverberatory furnaces, or furnaces with movable grills, at a temperature of about 1100° C. in order to obtain a product concentrated in aluminate $C_{12}A_7$ ($Ca_{12}Al_{14}O_{33}$). The final product is classified and packaged.

DESCRIPTION OF THE INVENTION

The present invention relates to a method for leveraging non-saline aluminum slags arising from obtaining aluminum from scrap or products of secondary smelting. By means of the method of the invention, the non-saline aluminum slags are transformed into calcium aluminates $CaO$—$Al_2O_3$, which are synthetic slags for metallurgical use, particularly for manufacturing steel.

From a metallurgical point of view, the use of calcium aluminates in steel manufacturing has the following advantages:

a) Quick slag formation: The low melting point of calcium aluminates, between 1325° C. and 1375° C. means that they melt in contact with the steel, dissolving other components, such as lime, obtaining a homogeneous and fluid slag.

b) The addition of calcium aluminates improves desulfurization kinetics due to the quick formation of slag, which enables the desulfurization reactions to start as soon as the casting ladle is filled. The increase in desulfurization speed can achieve a lower sulfur content and thus higher quality steel; increasing productivity due to to a lower treatment time; and reducing costs, due to the possibility of using cheaper raw materials with higher sulfur content.

c) Cleaning of the steel: the use of calcium aluminates, with a composition close to that of the final slag, causes the capture of non-metal inclusions as soon as the casting ladle is filled. Thus, it is possible to remove these impurities when they are formed and reduce the need for subsequent treatment.

d) Increase in productivity: The use of calcium aluminate increases the casting predictability and reproducibility, accelerates the formation of fluid and homogeneous slags, decreasing the refining time and reducing the total casting time.

e) Reduction of costs due to the decrease in corrosion of the refractory coatings of the furnaces, thereby increasing the durability of the refractory materials.

In a first aspect, the present invention relates to a method for obtaining calcium aluminates (hereinafter "method of the invention") comprising the following steps:

a) carrying out a reactive grinding of the non-saline aluminum slag in the presence of calcium carbonate $CaCO_3$;

b) thermally treating the product obtained in step a) at a temperature between 700° C. and 750° C.; and c) thermally treating the product obtained in step b) at a temperature between 1300° C. and 1400° C.

In the present invention calcium aluminates are understood as those $CaO$—$Al_2O_3$ systems described in R. W. Nurse, J. H. Welch and A. J. Majumdar, The $CaO$—$Al_2O_3$ System in a Moisture-free Atmosphere, Trans. Br. Ceram. Soc., 64, 409-418 (1965), inside the binary phase diagram. The term refers to the following five binary compounds: $CaAl_2O_4$ (CA), $CaAl_4O_7$ ($CA_2$), $Ca_{12}Al_{14}O_{33}$ ($C_{12}A_7$), $Ca_3AlO_6$ ($C_3A$), and $CaAl_{12}O_{19}$ ($CA_6$), where C=CaO y A=$Al_2O_3$.

The term "non-saline aluminum slag" is understood in the present invention as the slags generated in aluminum-obtaining processes from scrap metal (for example aluminum profiles, beverage containers or other aluminum materials that reach the end of their life cycle).

In a preferred embodiment, the non-saline aluminum slag of step a) has a percentage of hydrated aluminum oxide between 5% and 65%.

The aluminum content increases in the sintering in an inverse ratio to the aluminum hydrate content in the slag. It is probable that a portion of the mechanical energy supplied to the mixture during the reactive grinding is used, in the form of heat, in dehydrating the aluminum oxides, but it is probable that the aluminum oxide resulting from this process is less reactive than the initial α-$Al_2O_3$, existing in the slags.

In step a) of the method, non-saline aluminum slag is ground in the presence of calcium carbonate $CaCO_3$, the $Al_2O_3$:CaO molar ratio being comprised between 1:1 and 1:3, preferably 1:3.

The increase in the $C_3A$ content increases as the $Al_2O_3$/CaO ratio grows from 1:1 to 1:3 and this growth is accompanied by a decrease in the CA and $C_{12}A_7$ contents.

It is a reactive grinding in which binders are not used.

The grinding is performed by using mills with balls or concentric rings as grinding bodies. Preferably, the grinding of step a) is performed by means of a ball mill.

The mill spins at a high velocity (>500 rpm). The energy produced in the friction, or Coriolis force, produces an increase in the temperature of the slag and carbonate mixture, which is sufficient to start the dehydration reactions of the aluminum hydrates, even starting the carbonate decomposition reaction.

Preferably, the product obtained in step a) has an average particle size of less than 40 μm.

Step b) of the method of the invention consists of thermally treating the product obtained in step a) at a temperature between 700° C. and 750° C. in order to complete the decomposition of the calcium carbonate.

Step c) of the method of the invention consists of thermally treating the product obtained in step b) at a temperature of between 1300° C. and 1400° C.

The product obtained in step c) is packaged. FIG. 1 shows the diagram of the method of the invention.

Throughout the description and the claims, the word "comprises" and its variants are not intended to exclude other technical characteristics, additives, components or steps. For those skilled in the art, other objects, advantages and characteristics of the invention may be deduced from both the description and the practical use of the invention. The following examples and drawings are provided by way of illustration, and are not meant to limit the present invention.

| Symbols | |
|---|---|
| Sample/Crystalline phase | Indication in phase diagrams |
| Slag Al-1 | 1 |
| Slag Al-2 | 2 |
| Slag Al-3 | 3 |
| Sintering of slag Al-1 ($Al_2O_3$:CaO ratio 1:1) | 1S |
| Sintering of slag Al-2 ($Al_2O_3$:CaO ratio 1:1) | 2S |
| Sintering of slag Al-3 ($Al_2O_3$:CaO ratio 1:1) | 3S |
| Magnesium silicon aluminate | SA |
| Calcium monoaluminate (CA) | CA |
| Mayenite ($C_{12}A_7$) | M |
| Mg—Fe Spinel | Efe |
| Melanite | Me |
| Calcium trialuminate | $C_3A$ |
| Mg Spinel | E |
| Grossite ($CA_2$) | G |
| Gehlenite | Ge |
| Hibonite 5H | H |
| Bredigite | B |
| Wollastonite | W |
| Vesuvianite | V |

Figure 10:
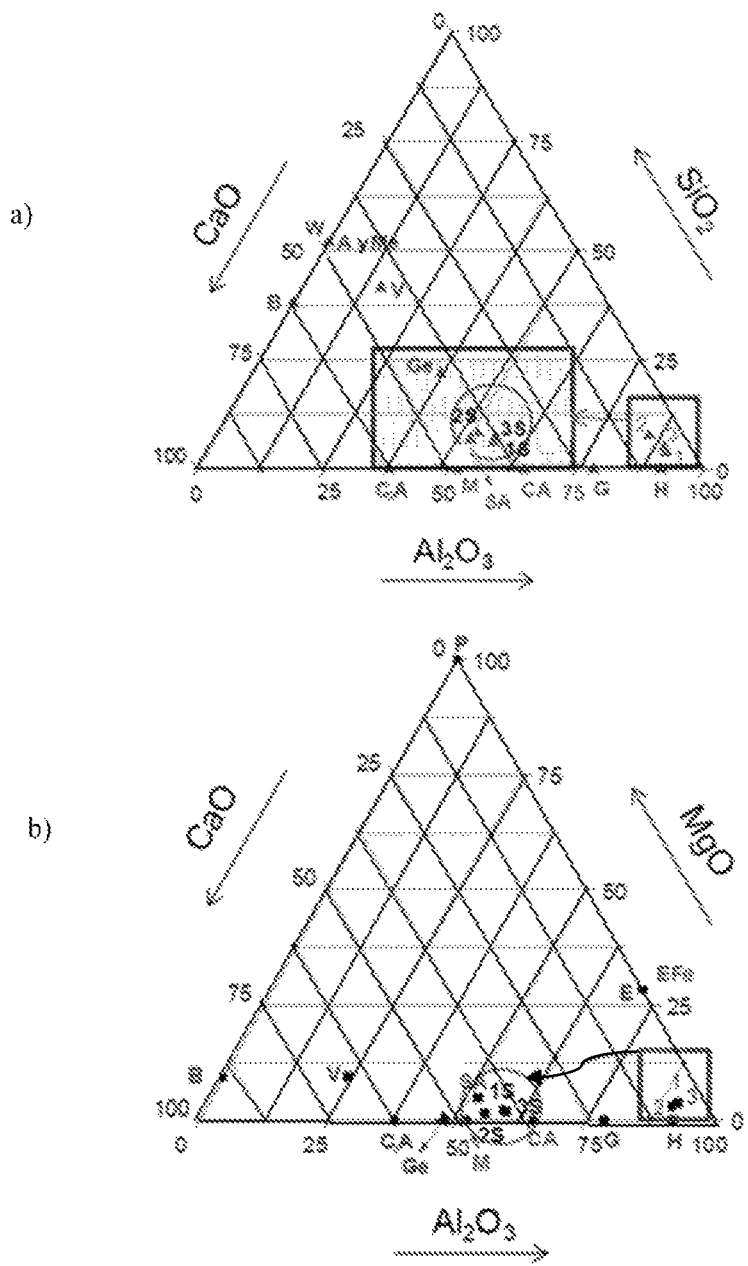

FIG. 10. Phase diagrams of the $Al_2O_3$-$SiO_2$-CaO system (A) where the initial slags and sintering products obtained are shown with $Al_2O_3$:CaO molar ratios of 1:1; 1:2 and 1:3 and of the $Al_2O_3$-MgO-CaO system (B).

Figure 11:
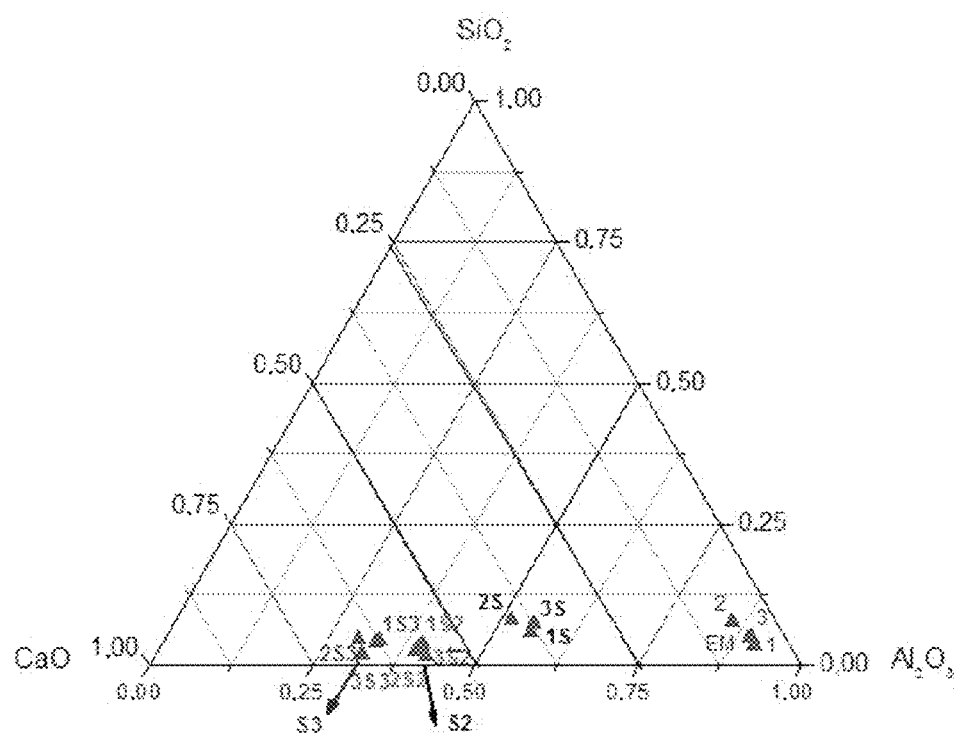

FIG. 11. Phase diagrams of the $Al_2O_3$—$SiO_2$—CaO system where the initial slags and sintering products obtained are shown with $Al_2O_3$:CaO molar ratios of 1:1; 1:2 and 1:3.

| Symbols | |
|---|---|
| | Indication in the diagram |
| Slag Al 1 | 1 |
| Slag Al 2 | 2 |
| Slag Al 3 | 3 |
| Sintering obtained from Al 1 slag for a $Al_2O_3$ molar ratio of 1:1 | 1S |
| Sintering obtained from Al 2 slag for a $Al_2O_3$:CaO molar ratio of 1:1 | 2S |
| Sintering obtained from Al 3 slag for a $Al_2O_3$:CaO molar ratio of 1:1 | 3S |
| Sintering obtained from Al 1 slag for a $Al_2O_3$:CaO molar ratio of 1:2 | 1S2 |
| Sintering obtained from Al 2 slag for a $Al_2O_3$:CaO molar ratio of 1:2 | 2S2 |
| Sintering obtained from Al 3 slag for a $Al_2O_3$:CaO molar ratio of 1:2 | 3S2 |
| Sintering obtained from Al 1 slag for a $Al_2O_3$:CaO molar ratio of 1:3 | 1S3 |
| Sintering obtained from Al 2 slag for a $Al_2O_3$:CaO molar ratio of 1:3 | 2S3 |
| Sintering obtained from Al 3 slag for a $Al_2O_3$:CaO molar ratio of 1:3 | 3S3 |
| Average Slag | EM |
| Sintering obtained from average slag for a $Al_2O_3$:CaO molar ratio of 1:2 | S2 |
| Sintering obtained starting from average slag for a $Al_2O_3$:CaO molar ratio of 1:3 | S3 |

Figure 12:
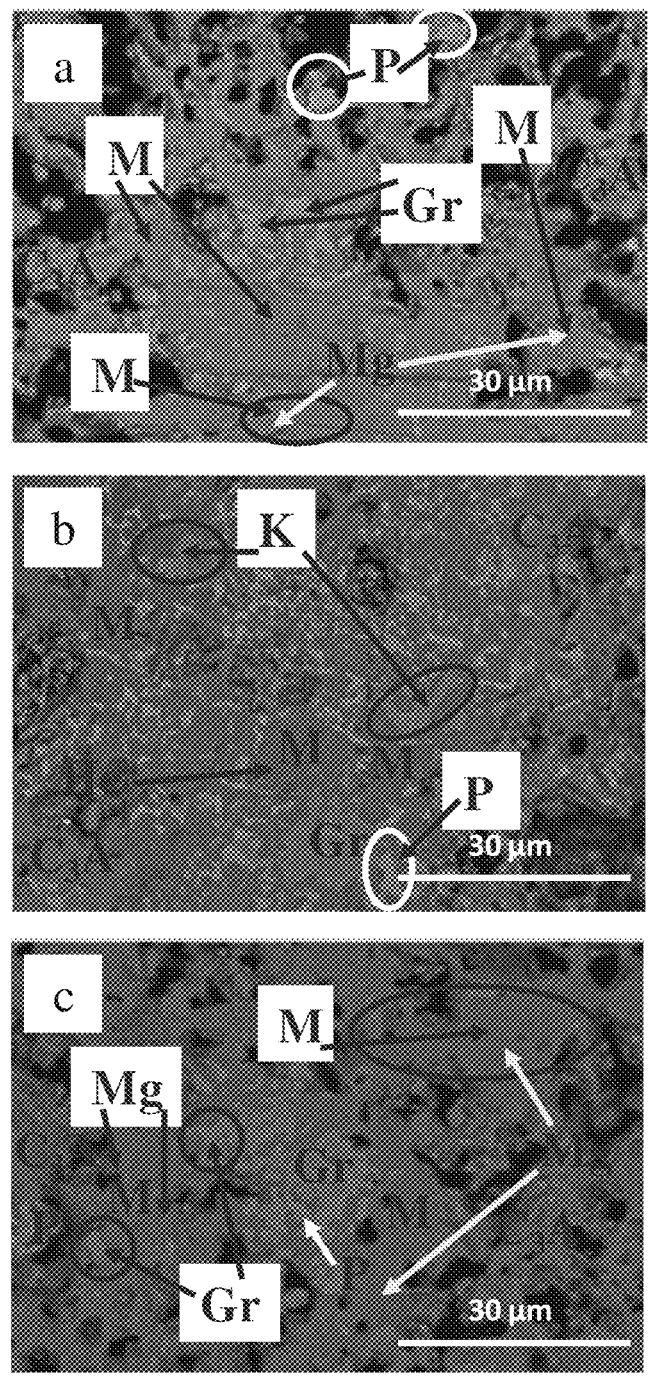

FIG. 12. SEM image (backscattered electrons) of the sintering products obtained at 1300° C. and molar ratio of 1:3. (a) Al-1 3S; (b) Al-2 3S and (c) Al-3 3S ($C_3A$=calcium trialuminate, M=mayenite or $C_{12}A_7$, Mg=MgO, P=$Al_{1.95}Fe_{0.49}Mg_{2.65}O_{12}Si_{2.91}$, Gr=$Ca_3Al_2(SiO_4)_3$, K=$Ca_6(SiO_4)(Si_3O_{10})$, and He=$FeAl_2O_4$.

Figure 13:
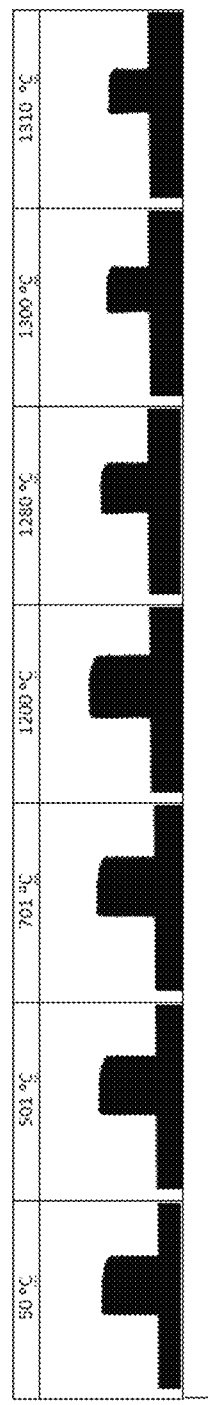

FIG. 13. Images obtained in a hot stage microscope in which a sintering sample obtained from the average slag (EM), at 1300° C. and with a $Al_2O_3$:CaO ratio is heated at 10° C./min from room temperature to 1350° C.

EXAMPLES

The invention is illustrated below by means of tests carried out by the inventors which reveal the effectiveness of the product of the invention.

Four non-saline aluminum slag samples were worked on, identified as Al-1; Al-2; Al-3 and EM. Samples Al-1; AL-2 and Al-3 are slags produced in the fusion plant that are differentiated from each other by the time that they have been stored outdoors. The EM sample is a mixture of the three previously described slags. The mixture was made up of 30% by weight of slag Al-1; 20% of slag Al-2 and 50% of slag Al-3. The percentages by weight of each of the slags were chosen with effectiveness criteria.

Sample Al-1: aluminum slag with an age of 3 to 7 years.
Sample Al-2: aluminum slag with an age of 7 to 10 years, stored outdoors.
Sample Al-3: recent aluminum slag, created between 2013-2014.
Sample EM: aluminum slag, mixture of slags Al-1, Al-2 and Al-3 (30-20-50)

Analysis of the Chemical Composition of the Aluminum Slag Samples.

The aluminum slags received are quartered and dried in a stove (80° C./24 h), the moisture of each sample being determined. Subsequently, the samples are ground in a TEMA mill for 15 minutes until matter with a particle size smaller than 40 μm is obtained.

The samples are bombarded with lithium metaborate at 1050° C. and acidified with concentrated nitric acid ($HNO_3$) in order to determine the chemical composition thereof by means of Inductively Coupled Plasma Spectroscopy, using for this purpose a spectrophotometer with ICP-OES optical emission, Varian 725-ES model.

Likewise, the losses from calcination were determined according to ISO standard 1171:2010. (815° C./1 h).

Table 1 shows the chemical composition of the slags.

TABLE 1

Chemical composition of the slags (% by weight expressed as oxides).

| | Al-1 | Al-2 | Al-3 | EM |
|---|---|---|---|---|
| $Al_2O_3$ | 75.67 | 58.42 | 81.94 | 75.35 |
| CaO | 4.54 | 4.59 | 4.718 | 4.64 |
| $Fe_2O_3$ | 3.70 | 4.55 | 1.84 | 2.94 |
| MgO | 3.17 | 1.96 | 3.35 | 3.02 |
| $SiO_2$ | 2.99 | 5.24 | 4.58 | 4.24 |
| $MnO_2$ | 0.10 | 0.25 | 0.20 | 0.27 |
| CuO | 0.14 | 0.40 | 0.10 | 0.17 |
| ZnO | 0.04 | 2.51 | 0.05 | 0.54 |
| NiO | 0.03 | 0.03 | 0.01 | 0.02 |
| LxC | 7.38 | 17.39 | 3.25 | 7.32 |
| Moisture | 2.43 | 11.67 | 0 | 0 |

(*LxC = Losses from calcination)

Slags Al-1 and Al-3 have similar chemical compositions, while slag Al-2 has a lower Al content and a higher Zn percentage. The losses from calcination, which include moisture, water interstitially absorbed, water from crystallization of mineralogical phases and decomposition of mineralogical phases, have values that are very different to each other.

Analysis of the Mineralogical Composition of the Aluminum Slag Samples.

The mineralogical composition of the aluminum slag samples was obtained by means of x-ray diffraction, using for this purpose a Siemens D5000 diffractometer, equipped with a Cu anode (Cu $K_\alpha$ radiation) and LiF monochromator for eliminating the $K_\beta$ radiation from the samples that contain iron. The voltage and current of the generator were 40 kV and 30 mA respectively. The measurement was performed continuously with steps of 0.03° and time of 3 s for each step. The interpretation of the diffractograms was carried out with assistance of the Powder Diffraction File (PDF-2) reference database from the ICDD (International Center for Diffraction Data) and the DIFFRACplus EVA software package offered by Bruker AXS.

Figure 2:
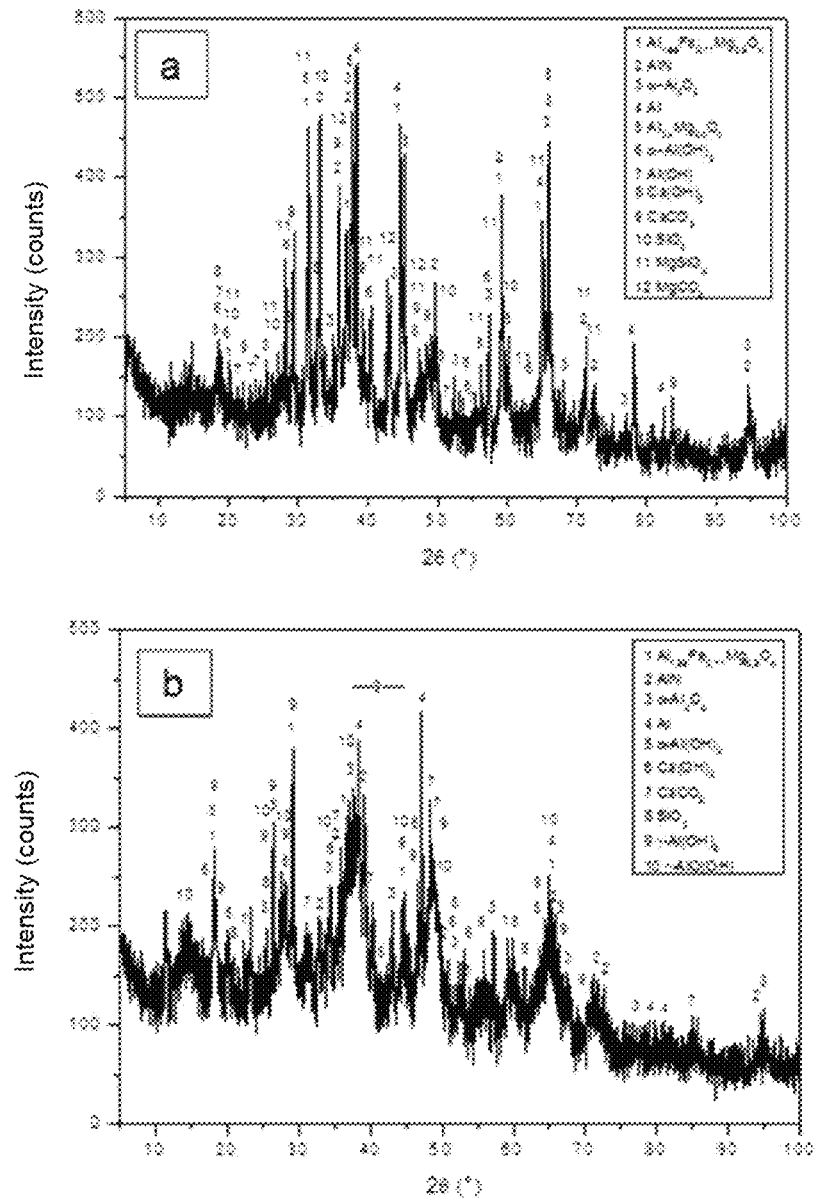
FIG. 2. X-ray diffraction graphs of the slags; (a) Al-1, (b) Al-2, (c) Al-3 and (d) EM.
Figure 2:
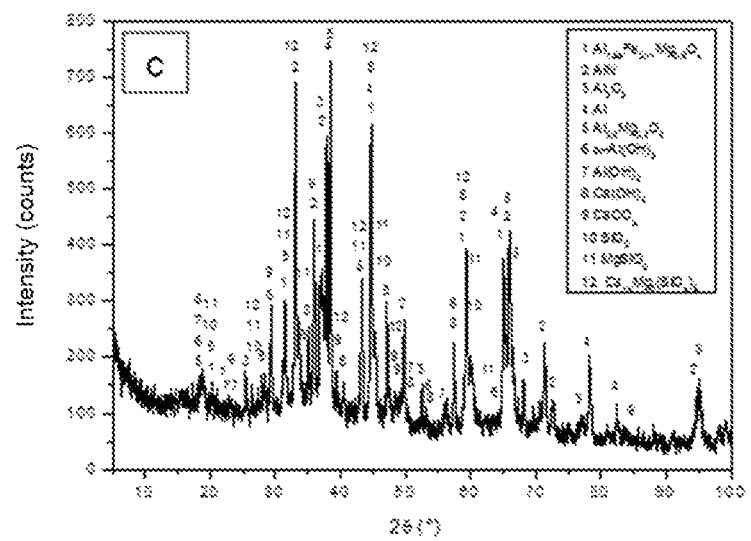
Figure 2:
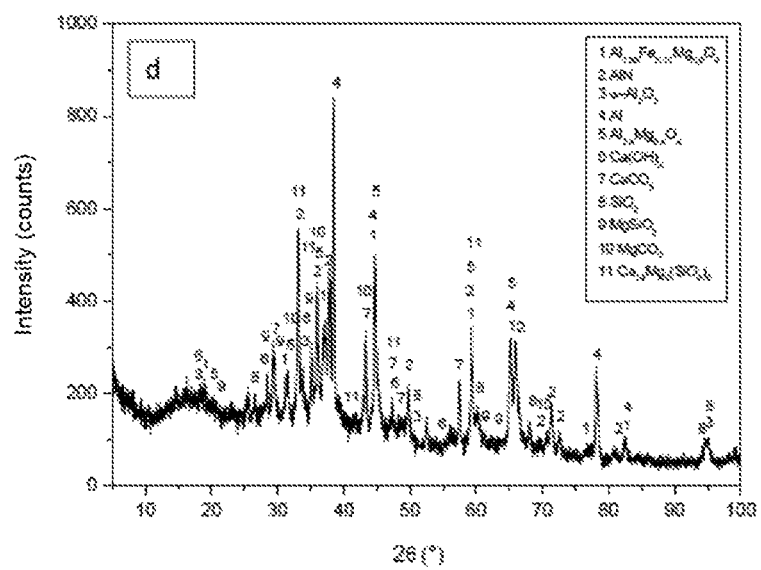

FIG. 2 contains the diffraction graphs of the slags studied. It is seen that the oldest slags (Al-1 and Al-2) (FIGS. 2a and 2b) have a greater amorphous character than the more recent slag (Al-3) (FIG. 2c), which clearly has a higher degree of crystallinity. FIG. 2(d) shows the diffraction graph of the EM sample where it is seen that said sample has a certain amorphous halo, which indicates that it is not a sample with high crystallinity.

It is shown that samples Al-1 and Al-3 have a similar mineralogical composition. In slag Al-2, boehmite and gibbsite appear, which do not appear in the other two slags and at the same time, phases such as nordstrandite, enstatite and magnesite and the Mg spinel are not present in this slag. Sample Al-2 is more hydrated than the other two, possibly due to having been stored outdoors for years.

Figure 3:
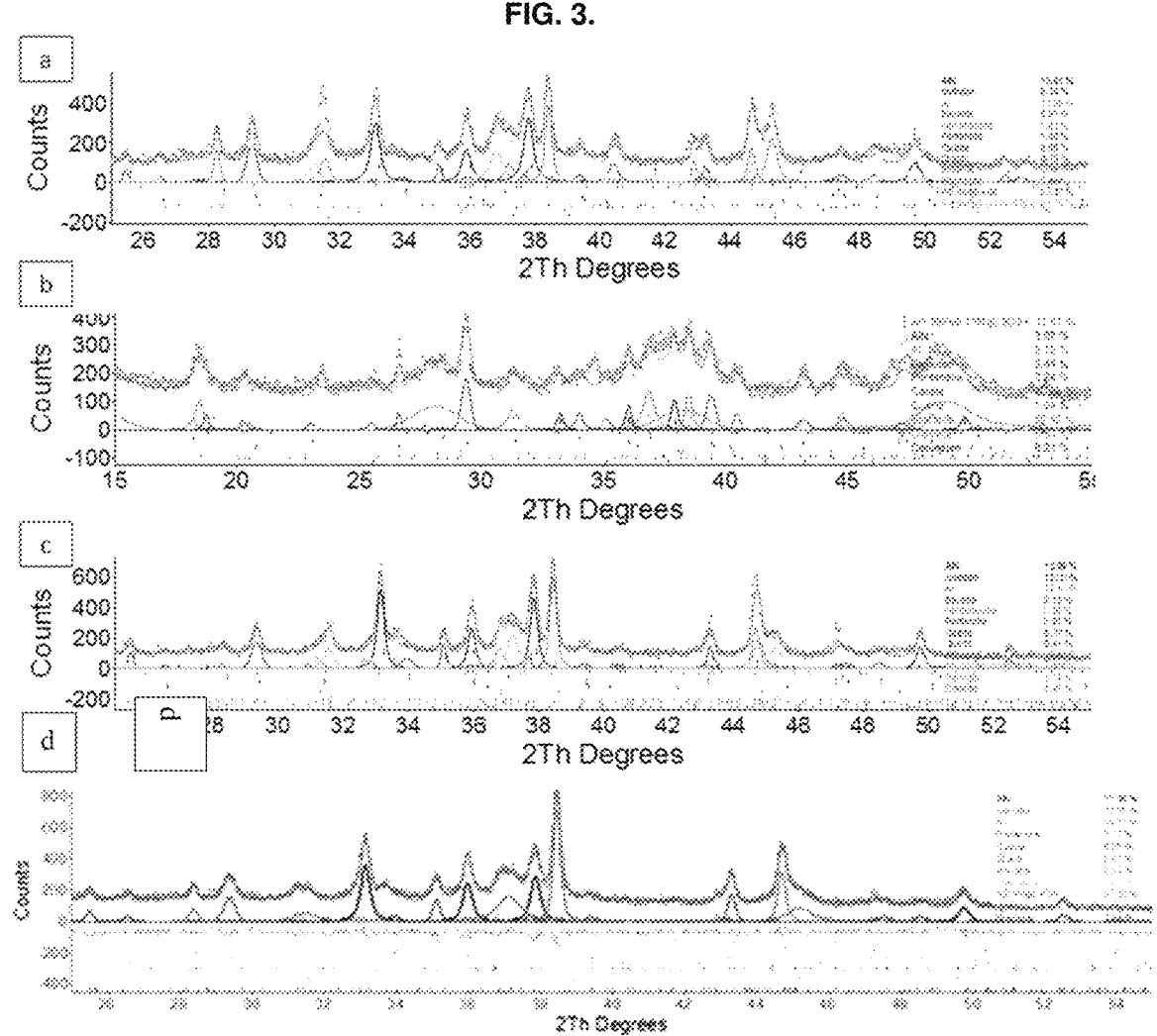
FIG. 3. Rietveld method curves for the slags; (a) Al-1, (b) Al-2, (c) Al-3 and (d) EM FIG. 4. (a, b) Secondary electron image of slag Al-1.

The quantitative study of the crystalline phases present in the slag samples was performed by means of the Rietveld method, based on the X-ray diffraction diagrams (DRX) (FIG. 3).

The quantification of the phases was performed using the TOPAS Rietveld (Bruker AXS) analysis program for refining DRX data. Once the fit is made, and the quality and reliability thereof ensured, the % of each phase was calculated from the residual values, R (Figures of Merit, FOM), considering that residual values less than 10% guarantee the goodness-of-fit and the reliability of the determination. Table 2 includes the quantitative mineralogical composition of the slags studied.

Slag Al-2, the oldest one, has greater differences regarding the mineralogical composition thereof, it being seen that it has a lower metal aluminum (Al) and aluminum nitride (AlN) content and in contrast, it has an elevated hydrated aluminum oxide, gibbsite ($\gamma$-Al(OH)$_3$) and boehmite (AlO(OH)) content, which represents 50.41% of the total.

The hydrated phases of the aluminum may have been formed as a consequence of the hydration of the aluminum metal and the aluminum nitride, according to reactions (3) to (5):

$$2Al + 6H_2O \rightarrow 2Al(OH)_3 + 3H_2 \quad (3)$$

$$2Al + 4H_2O \rightarrow 2AlO(OH) + 3H_2 \quad (4)$$

$$AlN + 3H_2O \rightarrow NH_3 + Al(OH)_3 \quad (5)$$

TABLE 2

Quantitative mineralogical composition of the slags studied, expressed in %.

| Crystalline phase | Al-1 | Al-2 | Al-3 | EM |
|---|---|---|---|---|
| Al$_{1.99}$Fe$_{0.11}$Mg$_{0.9}$O$_4$ | 23.30 | 13.57 | 24.16 | 6.71 |
| AlN | 13.91 | 3.07 | 12.89 | 11.38 |
| $\alpha$-Al$_2$O$_3$ | 8.34 | 6.21 | 12.00 | 13.16 |
| Al | 11.36 | 3.82 | 14.40 | 18.57 |
| Al$_{2.4}$Mg$_{0.4}$O$_4$ | 23.30 | — | 15.82 | 37.2 |
| $\alpha$-Al(OH)$_3$ | 5.91 | 3.44 | 2.13 | — |
| Al(OH)$_3$ | 1.82 | — | 0.89 | — |
| Ca(OH)$_2$ | 1.40 | 2.24 | 2.91 | 1.72 |
| CaCO$_3$ | 8.66 | 10.28 | 6.37 | 6.35 |
| SiO$_2$ | 0.78 | 1.04 | 0.41 | 0.97 |
| MgSiO$_3$ | 0.75 | — | 4.46 | 0.05 |
| MgCO$_3$ | 0.56 | — | — | 0.33 |
| $\gamma$-AlO(OH) | — | 50.41 | — | — |
| $\gamma$-Al(OH)$_3$ | — | 5.91 | — | — |
| Ca$_{14}$Mg$_2$(SiO$_4$)$_8$ | — | — | 3.57 | 3.44 |

The total content in Al and Ca hydrates varies in the order:
Al-2 (62%)>Al-1 (9.13%)>Al-3 (5.95%)>EM (1.72%)
which is the same order in which the losses from calcination vary.

Microstructural Analysis of the Aluminum Slag Samples.

The microstructural analysis is carried out by Scanning Electron Microscopy (FESEM) in a HITACHI S-4800, using a voltage of 15 kV. The samples for microscopy are put into a polymer resin and polished with 600, 1200 and 2000 grain sandpaper (adding carnauba to these in order to protect the sample). Subsequently, they were polished with 3 and 1 μm diamond paste and were metallized with carbon in a JEOL JEE 4B.

Figure 4:
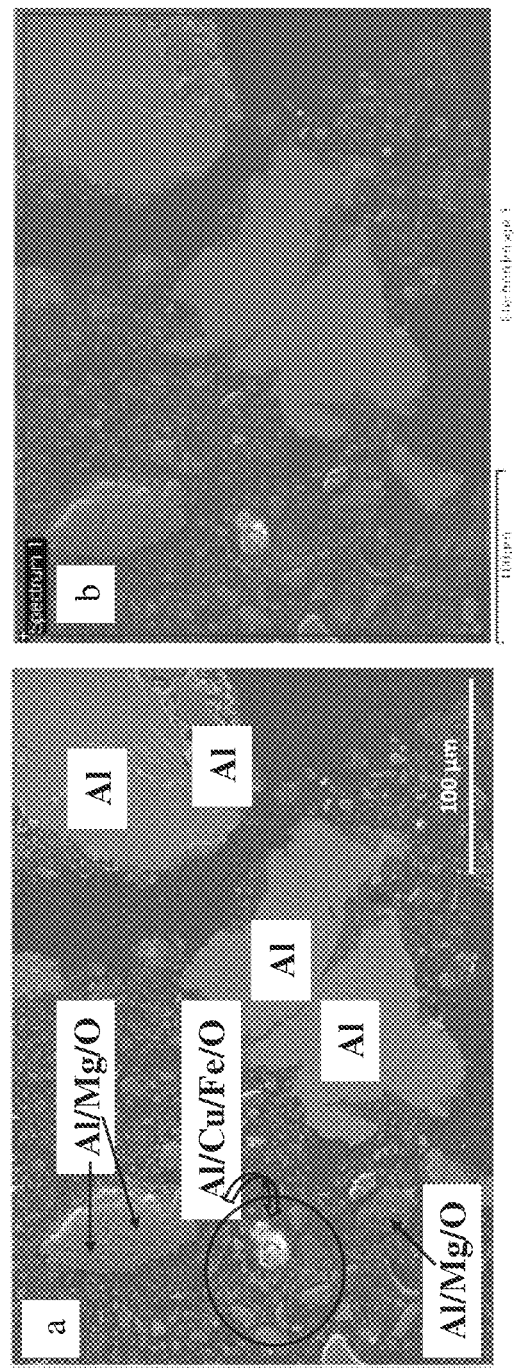
Figure 5:
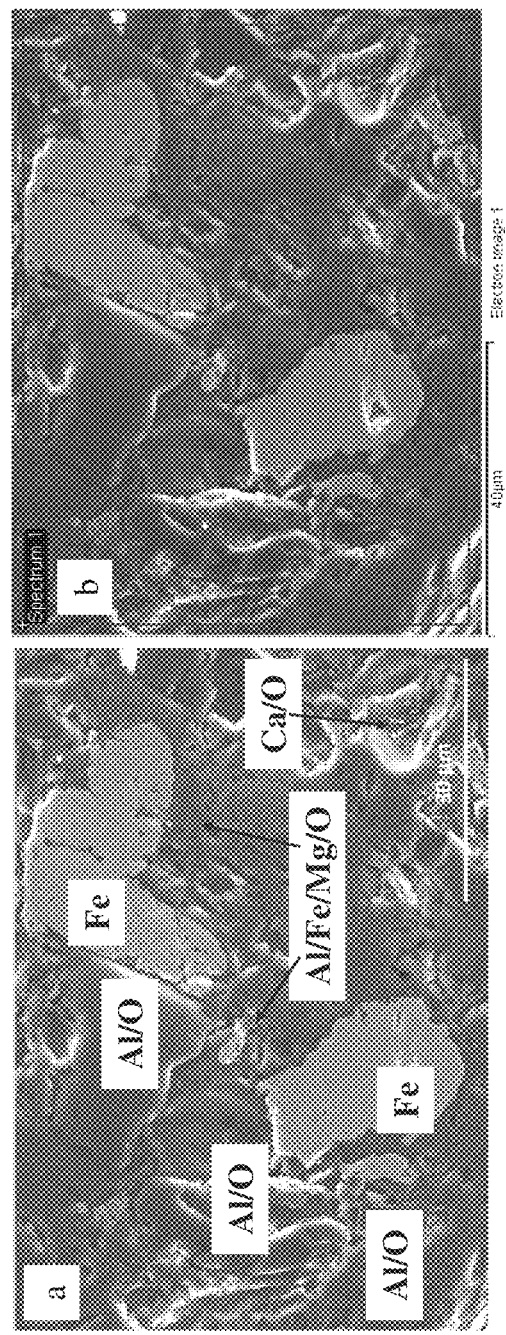
FIG. 5. (a, b) Secondary electron image of slag Al-2.
Figure 6:
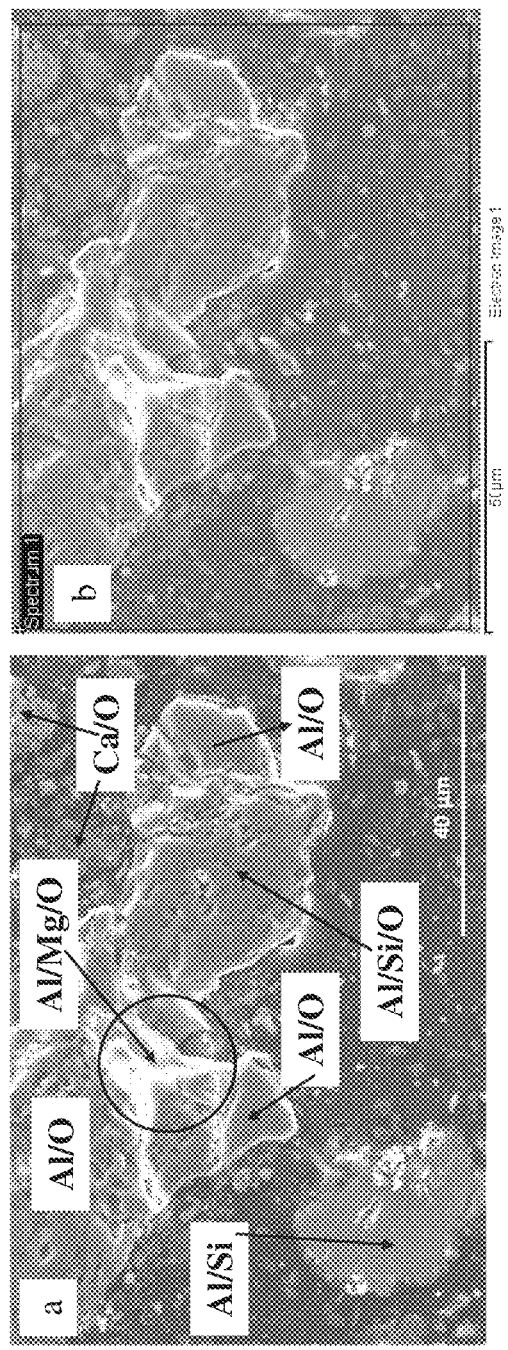
FIG. 6. (a, b) Secondary electron image of slag Al-3.

The morphological study is summarized in FIGS. 4 to 6. FIG. 4 (a, b), corresponding to slag Al-1, shows a morphology that is heterogeneous in size and appearance. The presence of released grains in which the aluminum combines with the oxygen (alumina) and with Mg—Fe (spinels). Particles also appear in which the major element is aluminum, without association to the oxygen (aluminum metal).

In FIG. 5 (a, b) the morphology of slag Al-2 is shown which has a surface with an appearance that is heterogeneous in grain size and appearance. The aluminum appears associated to iron and magnesium (spinel), calcium (in mixed alumina-calcite and/or portlandite grains) and silicon (in mixed alumina-silica grains) (a,c). The presence of metal aluminum is not observed.

FIG. 6 (a, b) corresponding to slag Al-3. It has a surface with an appearance that is heterogeneous in grain size and appearance. Morphologically, the slag is similar to slag Al-1.

Figure 1:
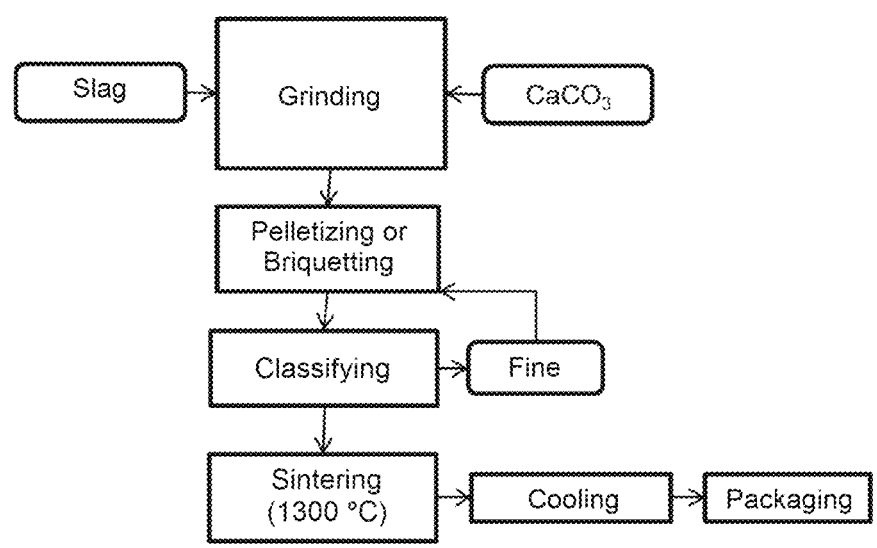
FIG. 1. Basic flowchart of obtaining calcium aluminate.

Below, the method outlined in FIG. 1 was performed.
Influence of the Reactive Grinding Time First, the influence of the reactive grinding time in the formation of aluminates was studied. To do so, slags Al-1; Al-2 and Al-3 were mixed with CaCO$_3$ in a molar ratio of Al$_2$O$_3$:CaO equal to 1:1, to subsequently prepare, by means of mechanical compacting, mini briquettes in order to subject them to different thermal treatments. A PA quality "reagent for analysis" CaCO$_3$ from PANREAC was used.

Reactive grindings were carried out for different amounts of time (4, 8, 12, 16 and 24 h) in a Fritsch Pulverisette 6 mill, at 450 rpm, with 5 stainless steel balls, the balls/mixture weight ratio being 6.5.

Once the grinding time has been completed, cylindrical mini-briquettes (13.5 mm (diameter)×5.5 (height)) were prepared, without adding binders, by means of configuration with a Specac Atlas manual 15 T hydraulic press. The pressure applied was 10543 kg/cm$^2$ with a pressure of 1034 MPa. The quantification of the components of the mixture is included in Table 3.

TABLE 3

Amounts of calcium carbonate (C$_{100}$) added to 100 g of slag for a 1:1 molar ratio of Al$_2$O$_3$:CaO

| Slag | C$_{100}$ (g) |
|---|---|
| Al-1 | 105.63 |
| Al-2 | 85.00 |
| Al-3 | 107.64 |

Subsequently, the mini-briquettes are sintered in a furnace made by Termiber de Ingeniería Térmica, S. A., at 1300° C. for 1 h, with a prior isothermal step at 750° C. for 1 h, in order to achieve the complete decomposition of the calcium carbonate.

Figure 7:
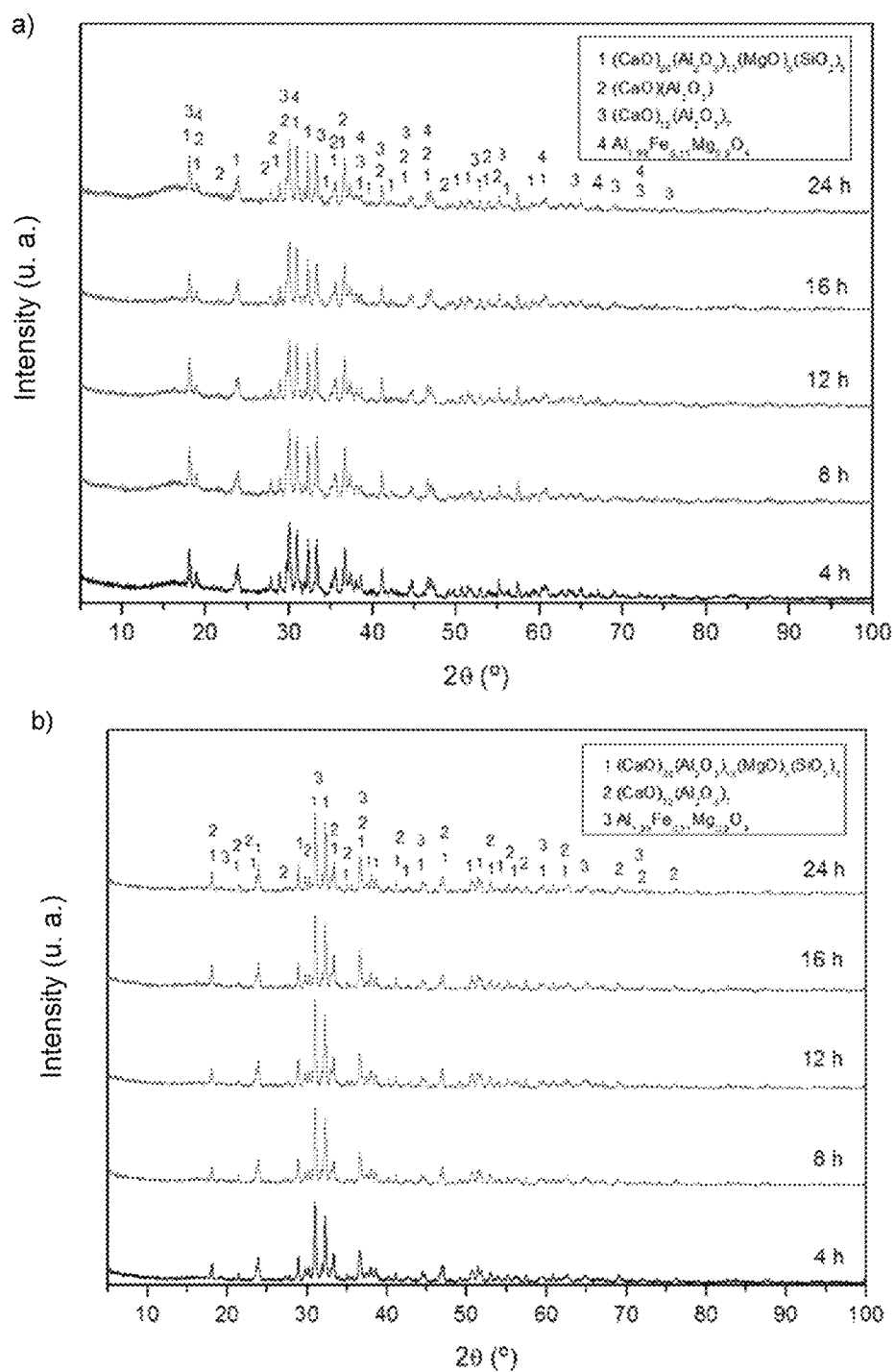
FIG. 7. X-ray diffraction graphs of the products sintered at 1300° C. obtained from the different slags studied (a) Al-1S; (b) Al-2S and (c) Al-3S (reactive grinding 1 h. $Al_2O_3$:CaO molar ratio:=1:1).
Figure 7:
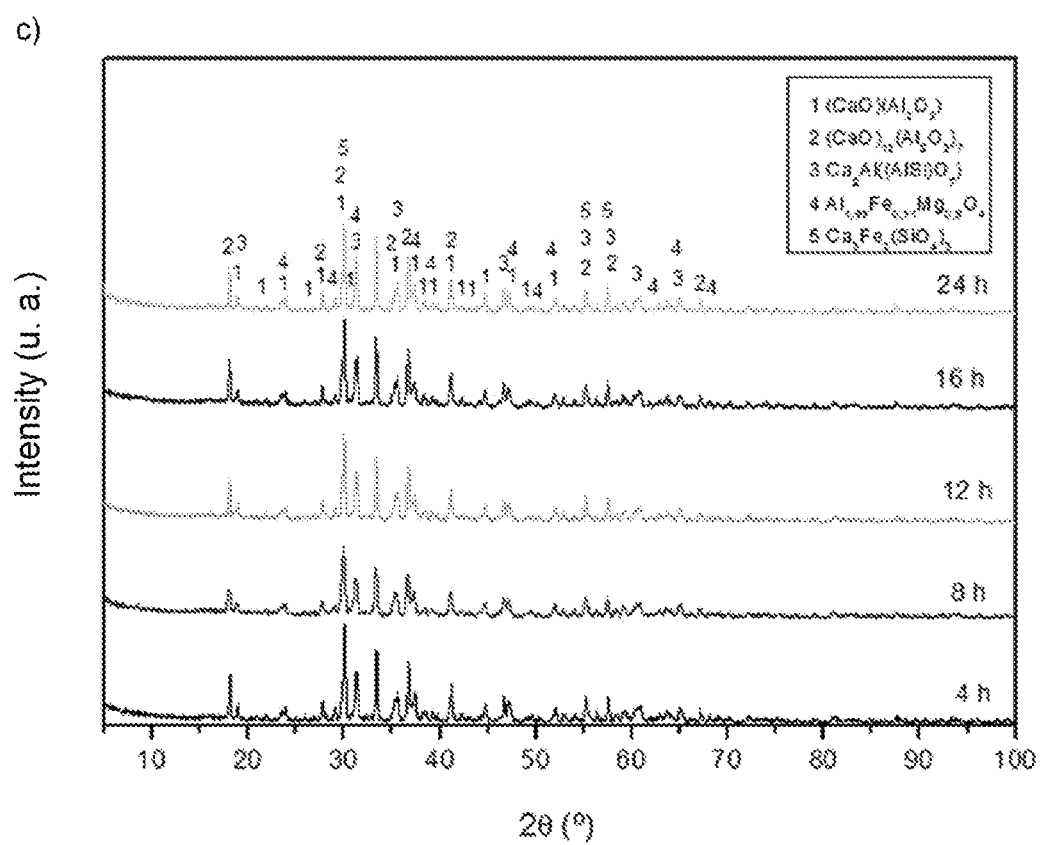

The sintered products (Al-1S; Al-2S and Al-3S) were characterized by means of x-ray diffraction, Rietveld quantification, chemical analysis and morphological study by means of SEM, using the techniques and methods described in the previous section. FIG. 7 shows the x-ray diffraction diagrams of the products sintered at 1300° C. obtained for the different slags studied.

Figure 8:
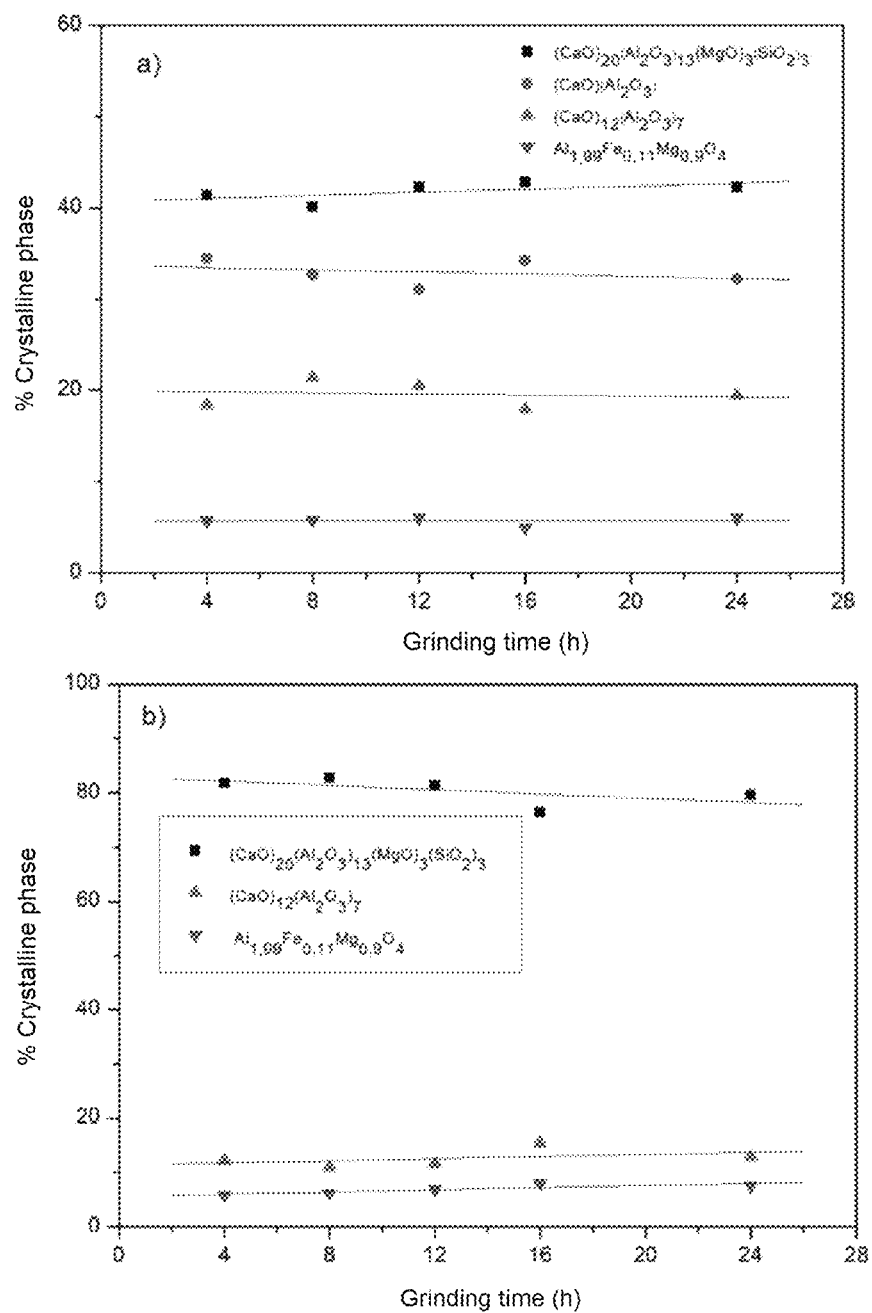
FIG. 8. Variation of the crystalline phase content based on the reactive grinding time, after sintering at 1300° C., for the slags used. a) Al-1S; b) Al-2S and c) Al-3S.
Figure 8:
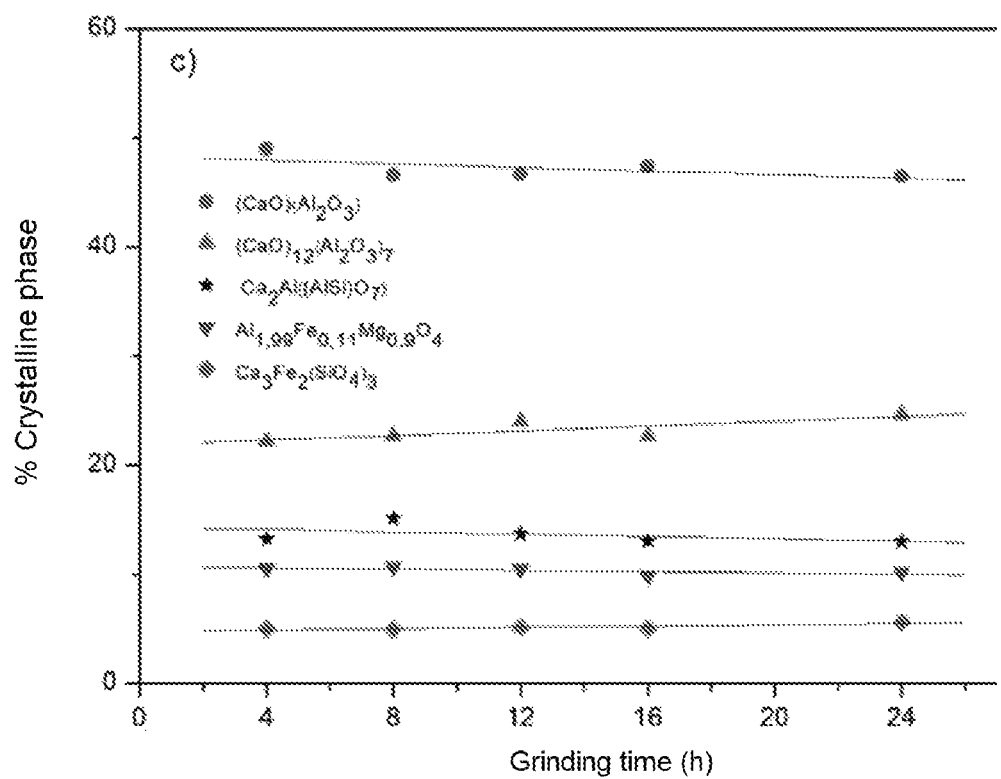

Based on the study of the mineralogical composition of the sintering products, it is deduced that there is no significant variation of the sintering products based on the grinding time (FIG. 8). Consequently, for the study of the rest of the parameters of the process, a reactive grinding time of 1 hour will be used.

It is important to note the influence that the age of the slag has in the formation of aluminates. Thus, a higher aluminate content is observed in the sintering of Al-3S (CA and $C_{12}A_7$) than in the rest. In the Al-3S sintering, the total aluminate content is comprised between 69% and 74% compared to 49%-56% in the Al-1S sintering and 11%-15% in the Al-2S sintering (Table 4).

From the results obtained, the existence of an inverse relation is deduced between the Ca and Al hydrate content in the initial slag and the aluminate content in the sintered product.

| | |
|---|---|
| Hydrate content Slag "age" | Al-2 > Al-1 > Al-3 |
| Aluminate content of sintered product | Al-2 < Al-1 < Al-3 |

TABLE 4

Mineralogical composition of the sintered matter with each of the slags (CaO:$Al_2O_3$ molar ratio of 1:1. Reaction times comprised between 1 h and 48 h)

| Crystalline Phases | Al-1S (%) | Al-2S (%) | Al-3S (%) |
|---|---|---|---|
| $Ca_{12}Al_{14}O_{33}$ ($C_{12}A_7$) | 17.95-21.39 | 10.96-15.51 | 22.19-24.68 |
| $Al_2CaO_4$ (CA) | 31.10-34.47 | — | 46.51-49.01 |
| Total Aluminates | 49-56 | 11-15 | 69-74 |
| $Al_{1.99}Fe_{0.11}Mg_{0.90}O_4$ | 4.93-6.03 | 5.85-8.04 | 9.84-10.64 |
| $Ca_{20}Mg_3Al_{26}Si_3O_{68}$ | 40.13-42.86 | 76.45-82.82 | — |
| $Ca_3Fe_2[SiO_4]_3$ (andradite) | — | — | 4.95-5.64 |
| $Al_2Ca_2O_7Si$ (gehlenite) | — | — | 13.03-15.13 |
| Total rest of Phases | 45-49 | 82-91 | 28-33 |

Finally, Table 5 contains the chemical composition of the sintering products obtained for a reactive grinding time of 1 h.

TABLE 5

Chemical composition (% weight) of the sintering products obtained for a reactive grinding time of 1 h and a $Al_2O_3$:CaO molar ratio equal to 1:1

| Component | Al-1S | Al-2S | Al-3S |
|---|---|---|---|
| $Al_2O_3$ | 51.75 | 49.25 | 56.63 |
| $Fe_2O_3$ | 2.68 | 2.27 | 1.54 |
| CaO | 35.87 | 39.64 | 38.14 |
| MgO | 2.03 | 1.40 | 1.84 |
| $SiO_2$ | 5.44 | 7.82 | 7.51 |
| $MnO_2$ | 0.21 | 0.14 | 0.18 |
| NiO | 0.04 | 0.05 | 0.04 |
| CuO | 0.12 | 0.35 | 0.09 |
| ZnO | 0.29 | 2.80 | 0.16 |

Figure 9:
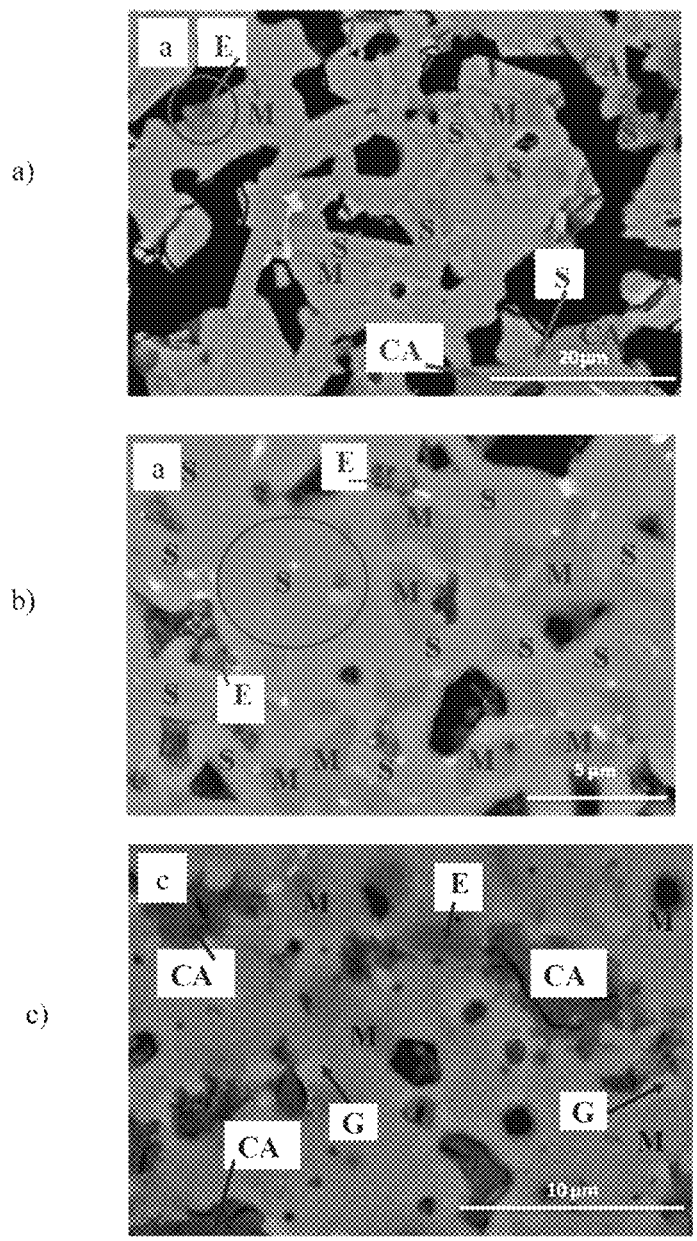
FIG. 9. SEM images (secondary electron) of the sintering products obtained at 1300° C. for a $Al_2O_3$:CaO molar ratio of 1:1. a) Al-2S; b)Al-2S and c) Al-3S (S=magnesium silicon aluminate, CA=calcium aluminate, M=mayenite or $C_{12}A_7$ and E=spinel; Ge=gehlenite).

Morphologically, FIG. 9 shows different appearances of the sintering products obtained from each of the slags studied for a reactive grinding time of 1 h.

In FIG. 9, distinct mineralogical phases existing in the sintering products can be identified by means of backscattered electrons.

FIG. 10 shows the ternary diagrams of the $Al_2O_3$—$SiO_2$—CaO and $Al_2O_3$—MgO—CaO systems, situating therein the three initial slags and the sintering products obtained with each one of the former ($Al_2O_3$:CaO molar ratio equal to 1:1).

The sintering products are within the area of chemical compositions of synthetic slags indicated by Richarson (1974) [Richarson, F. D. Physical chemistry of metal son metallurgy. Vol. 2. Academic Press, 1974. Synthetic slags for steelmaking. AMG Vanadium, Inc. 2010.] (see FIG. 10) as suitable for use in steel manufacturing, especially for the desulfurization effect thereof. At the same time, the sintering products have MgO content around 2%, which represents added value, since this compound has a favorable effect in the protection of the refractory materials.

Influence of the CaO:$Al_2O_3$ Molar Ratio in the Formation of Calcium Aluminates Slag mixtures were prepared with the amounts of $CaCO_3$ that are included in Table 6 for $Al_2O_3$:CaO molar ratios of 1:2 and 1:3 in order to subsequently prepare, by means of mechanical compacting, mini-briquettes in order to subject them to thermal treatment. In order to prepare the briquettes with $Al_2O_3$:CaO molar ratio=1:2, an RA quality "reagent for analysis" $CaCO_3$ from PANREAC is used, and in order to prepare the ones with $Al_2O_3$:CaO molar ratio=1:3 a limestone from the ARZYZ company was used.

TABLE 6

Amounts of calcium carbonate ($C_{100}$) added to 100 g of slag for different molar ratios of $Al_2O_3$/CaO.

| | $C_{100}$ (g) | | |
|---|---|---|---|
| Slag | Ratio 1:1 | Ratio 1:2 | Ratio 1:3 |
| Al-1 | 105.63 | 211.26 | 316.89 |
| Al-2 | 85.00 | 170.00 | 255.00 |
| Al-3 | 107.64 | 215.28 | 322.92 |
| EM | — | 205.02 | 338.28 |

Reactive grindings were carried out for 5 h, in a Fritsch Pulverisette 6 mill, at 450 rpm, with 5 stainless steel balls, the balls/mixture weight ratio being 6.54.

Once the grinding time ended, cylindrical mini-briquettes (13.5 mm (diameter)×5.5 (height)) were prepared, without adding binders, by means of configuration with a Specac Atlas manual 15 T hydraulic press, with a pressure of 1034 MPa.

Subsequently, the mini-briquettes are subjected to thermal treatment (sintering) in a furnace made by Termiber de Ingeniería Térmica, S. A., at 1300° C. for 1 h, with a prior isothermal heat step at 750° C. for 1 h in order to achieve the complete decomposition of the calcium carbonate.

The appearance of the briquettes is analyzed before and after the thermal treatment. It is observed that the briquettes show a change in color and good formation after the thermal treatment. The products of the sintering show a different color for each of the two molar ratios tested.

The chemical composition of the sintering products obtained for the different molar ratios and slags used are shown in Table 7.

TABLE 7

Average chemical composition of the sintering materials obtained based on the Al₂O₃:CaO molar ratio.

| Component (% weight) | Molar ratio 1:1 | | | | Molar ratio 1:2 | | | | Molar ratio 1:3 | | | |
|---|---|---|---|---|---|---|---|---|---|---|---|---|
| | Al1 1S | Al2 1S | Al3 1S | EM 1S | Al1 2S | Al2 2S | Al3 2S | EM 2S | Al1 3S | Al2 3S | Al3 3S | EM 3S |
| $Al_2O_3$ | 51.75 | 49.25 | 51.75 | — | 41.98 | 38.12 | 39.11 | 42.43 | 31.88 | 28.94 | 34.68 | 31.23 |
| $Fe_2O_3$ | 2.68 | 2.27 | 2.68 | — | 1.69 | 1.75 | 1.02 | 1.73 | 1.36 | 1.61 | 0.81 | 1.37 |
| CaO | 35.87 | 39.64 | 35.87 | — | 58.87 | 55.77 | 55.81 | 57.54 | 61.80 | 63.96 | 65.32 | 65.56 |
| MgO | 2.03 | 1.40 | 2.03 | — | 1.07 | 1.41 | 1.47 | 1.60 | 1.20 | 0.92 | 1.29 | 1.99 |
| $SiO_2$ | 5.44 | 7.82 | 5.44 | — | 3.85 | 2.50 | 2.94 | 3.24 | 3.87 | 4.62 | 4.51 | 3.47 |
| $MnO_2$ | 0.21 | 0.14 | 0.21 | — | 0.11 | 0.17 | 0.14 | 0.15 | 0.13 | 0.08 | 0.11 | 0.12 |
| NiO | 0.04 | 0.05 | 0.04 | — | 0.027 | 0.022 | 0.015 | 0.02 | 0.02 | 0.02 | 0.05 | 0.02 |
| CuO | 0.12 | 0.35 | 0.12 | — | 0.29 | 0.065 | 0.035 | 0.15 | 0.09 | 0.21 | 0.05 | 0.11 |
| ZnO | 0.29 | 2.80 | 0.29 | — | 2.39 | 2.70 | 0.12 | 0.69 | 0.22 | 1.91 | 0.11 | 0.40 |

The mineralogical composition, after the phase quantification performed by means of the Rielved method, appears in Table 8.

TABLE 8

Composition (%) in crystalline phase of the sintering products obtained for the Al₂O₃:CaO molar ratio equal to 1:3 starting from the initial slags.

| Component (% weight) | Molar ratio 1:1 | | | | Molar ratio 1:2 | | | | Molar ratio 1:3 | | | |
|---|---|---|---|---|---|---|---|---|---|---|---|---|
| | Al1 1S | Al2 1S | Al3 1S | EM 1S | Al1 2S | Al2 2S | Al3 2S | EM 2S | Al1 3S | Al2 3S | Al3 3S | EM 3S |
| $CaAl_2O_4$ (CA) | 31.1 | — | 46.5 | — | — | — | — | — | — | — | — | — |
| $CaO)_3(Al_2O_3)$ ($C_3A$) | — | — | — | — | 49.4 | 49.8 | 39.2 | 49.74 | 85.0 | 71.6 | 87.0 | 82.16 |
| $(CaO)_{12}(Al_2O_3)_7$ ($C_{12}A_7$) | 18.0 | 11.0 | 22.2 | — | 32.4 | 30.6 | 41.5 | 31.43 | 5.2 | 3.7 | 5.3 | 6.45 |
| Total Aluminates | 49.1 | 11.0 | 68.7 | — | 81.9 | 80.5 | 80.7 | 81.17 | 90.2 | 75.4 | 92.2 | 88.61 |
| $Al_{1.95}Fe_{0.49}Mg_{2.65}O_{12}Si_{2.91}$ | 4.9 | 5.9 | 9.8 | — | 2.6 | 10.9 | 1.7 | 3.78 | 2.3 | 9.7 | 1.8 | 2.94 |
| $Ca_3Al_2(SiO_4)_2$ | — | — | — | — | 13.4 | — | 16.0 | 13.34 | 2.1 | 1.8 | 1.4 | — |
| $Ca_6(SiO_4)(Si_3O_{10})$ | — | — | — | — | — | 7.0 | — | — | — | 9.0 | — | — |
| $Al_{0.2}Fe_{1.8}MgO_4$ | — | — | — | — | — | 2.0 | — | — | — | 1.0 | — | — |
| $Ca_{20}Mg_3Al_{26}Si_3O_{68}$ | 40.1 | 76.4 | — | — | — | — | — | — | — | — | — | — |
| $Ca_3Fe_2[SiO_4]_3$ | — | — | 4.9 | — | — | — | — | — | — | — | — | — |
| $Al_2Ca_2O_7Si$ | — | — | 13.0 | — | — | — | — | — | — | — | — | — |
| Total silicates and other phases | 45.0 | 82.3 | 28.7 | — | 16.0 | 20.0 | 17.7 | 17.12 | 4.4 | 21.6 | 3.1 | 2.94 |
| SiO2 | — | — | — | — | — | — | — | — | — | 0.2 | — | — |
| CaO | — | — | — | — | — | — | — | — | 3.3 | 2.8 | 2.2 | 5.58 |
| MgO | — | — | — | — | — | — | — | 1.70 | 2.0 | — | 2.3 | 2.87 |

Table 8 shows that the sintering products obtained for Al₂O₃:CaO molar ratios greater than 1:1 are fundamentally made up of aluminates. In contrast, for a molar ratio of 1:1 the silicate content and other mineralogical phases is higher than the aluminate content, except for the case of slag Al3 in which the opposite happens. If the EM:CaCO₃=1:2 and EM:CaCO₃=1:3 compositions are compared, an increase in the total aluminate content is observed for the EM:CaCO₃=1:3 slag.

Table 9 compares the aluminate and silicate content in the sintering products obtained for different molar ratios and slags.

TABLE 9

Composition (%) in crystalline phases of the sintering products obtained for the Al₂O₃:CaO molar ratios equal to 1:1, 1:2 and 1:3.

| Sample (molar ratio Al₂O₃:CaO) | Aluminates (%) | Silicates and other phases (%) |
|---|---|---|
| Al-1 (ratio of 1:1) | 49.1 | 45.0 |
| Al-1 (ratio of 1:1) | 11.0 | 82.3 |
| Al-1 (ratio of 1:1) | 68.7 | 28.7 |
| EM (ratio of 1:1) | — | — |
| Al-2 (ratio of 1:) | 81.9 | 16.0 |
| Al-2 (ratio of 1:2) | 80.5 | 19.9 |
| Al-2 (ratio of 1:2) | 80.7 | 17.6 |
| EM (ratio of 1:2) | 81.2 | 17.1 |
| Al-3 (ratio of 1:3) | 90.2 | 4.4 |
| Al-3 (ratio of 1:3) | 75.4 | 21.6 |
| Al-3 (ratio of 1:3) | 92.2 | 3.1 |
| EM (ratio of 1:3) | 88.6 | 2.9 |

In general, an increase in the Al₂O₃:CaO molar ratio causes a significant decrease in the silicate content, which goes from 17% in the sintered EM:CaCO₃=1:2 sample to a low 3% in the EM:CaCO₃=1:3 sample. In other words, an increase in the calcium content in the system favors the reaction of this element with the aluminum, to the detriment of the reaction of the calcium with the silicon.

With a molar ratio of 1:3, a significant change is caused in the nature of the calcium aluminates existing in the sintering products with respect to the composition of the sintering products obtained at $Al_2O_3$:CaO molar ratios of 1:1 and 1:2. It is observed, for all the slags considered, that the percentage of the mayenite ($C_{12}A_7$) decreases which changes from 31% in the sintered EM:$CaCO_3$=1:2 sample to a low 6% in the majority phase in the EM:$CaCO_3$=1:3 sample, the disappearance of the monocalcium aluminate CA and the main formation of tricalcium aluminate ($C_3A$), as the CaO content in the sintering products increases. This is due to the greater diffusion of the $Ca^{2+}$ in the $Al_2O_3$ according to reaction (6) which summarizes the mechanism of the formation process:

$$A+C \rightarrow AC+C \rightarrow C_{12}A_7+C \rightarrow C_3A \qquad (6)$$

It can be seen how the increase of CaO (C) in the system transforms the $Al_2O_3$ into monocalcium aluminate that is then transformed into $C_{12}A_7$ and perhaps other intermediary aluminates, and finally into tricalcium aluminate.

In these results, it is important to take into account that the EM:$CaCO_3$=1:3 sample contains commercial limestone from the company ARZYZ and that, in light of the data obtained, it could be considered that the use thereof does not worsen the result as far as aluminate formation.

FIG. 11 situates, in the CaO—$Al_2O_3$—$SiO_2$ diagram, the sintering products obtained for different molar ratios.

The EM:$CaCO_3$=1:2 and 1:3 sintering materials enter into the area of chemical compositions of synthetic slags indicated by Richarson in Richarson, F. D. Physical chemistry of metal son metallurgy. Vol. 2. Academic Press, 1974 and indicated in Synthetic slags for steelmaking. AMG Vanadium, Inc. 2010. as suitable for use in steel manufacturing, especially for the desulfuring effect thereof. At the same time, the sintering products obtained, with MgO content of around 2%, which represent added value, since this compound has a favorable effect in the protection of the refractory materials.

FIG. 12 identifies, by means of backscattered electrons, the mineralogical phases existing in the sintering products obtained from each of the slags studied for a reactive grinding time of 1 h and a $Al_2O_3$:CaO molar ratio equal to 1:3.

In the sintering products Al1 2S, Al2 2S and Al3 2S, the main phases are calcium aluminates (calcium trialuminate—$C_3A$ and mayenite—$C_{12}A_7$), the majority being, generally, the $C_3A$ phase.

Finally, FIG. 13 shows the study by means of hot stage microscopy of a sintering sample obtained from the average slag (EM) with a CaO addition necessary for achieving an $Al_2O_3$:CaO ratio equal to 1:3. The sintering sample is heated at 10° C./min until a final temperature of 1350° C. is reached. It is observed that a decrease in the area of the sample is produced at 1280° C., which indicative of the start of the deformation. However, at the final temperature of the test, the sample does not reach the temperature of the sphere or the semi-sphere, which means that it complies with one of the fundamental properties of the aluminates for use in the metallurgy industry: thermal stability at temperatures to the order of 1300° C.

The invention claimed is:

1. A method for obtaining a mixture of the following calcium aluminates suitable for the manufacturing of steel: $CaAl_2O_4$(CA), $CaAl_4O_7$($CA_2$), $Ca_{12}Al_{14}O_{33}$ ($C_{12}A_7$), $Ca_3AlO_6$ ($C_3A$) and $CaAl_{12}O_{19}$ ($CA_6$), where C=CaO and A=$Al_2O_3$, from a non-saline aluminum slag comprising the following steps:
   a) carrying out a reactive grinding of the non-saline aluminum slag from recovery by melting aluminum scrap metal or products of secondary melting of aluminum in the presence of calcium carbonate $CaCO_3$, wherein the non-saline aluminum slag is generated from scrap metal and the reactive grinding of the non-saline aluminum slag with $CaCO_3$ is carried out at a molar ratio of 1:3 $Al_2O_3$:CaO;
   b) thermally treating the product obtained in step a) at a temperature between 700° C. and 750° C. for one hour; and
   c) thermally treating the product obtained in step b) at a temperature between 1300° C. and 1400° C.

2. The method according to claim 1, wherein the non-saline aluminum slag of step a) has a percentage of hydrated aluminum oxides between 5% and 65%.

3. The method according to claim 1, wherein the grinding of step a) is carried out by means of a ball mill.

4. The method according to claim 1, wherein the product obtained in step a) has an average particle size of less than 40 μm.

5. The method according to claim 1, wherein the content of the mixture of the following calcium aluminate $CaAl_2O_4$ (CA), $CaAl_4O_7$ ($CA_2$), $Ca_{12}Al_{14}O_{33}$ ($C_{12}A_7$), $Ca_3AlO_6$ ($C_3A$) and $CaAl_{12}O_{19}$ ($CA_6$), where C=CaO and A=$Al_2O_3$, of step c) is comprised between 70% and 92%.

6. The method according to claim 1, wherein between 71% and 85% of the calcium aluminates produced by the method are tricalcium aluminate $Ca_3AlO_6$ ($C_3A$).

* * * * *